(12) United States Patent
Nagazumi

(10) Patent No.: US 6,473,454 B1
(45) Date of Patent: Oct. 29, 2002

(54) RAKE COMBINER APPARATUS USING CHARGE TRANSFER ELEMENT

(75) Inventor: Yasuo Nagazumi, 6-10, Meguro 4-chome, Meguro-ku, Tokyo 153-0063 (JP)

(73) Assignees: G.D.S. Co., Ltd, Tokyo (JP); Yasuo Nagazumi, Tokyo (JP)

( * ) Notice: Subject to any disclaimer, the term of this patent is extended or adjusted under 35 U.S.C. 154(b) by 0 days.

(21) Appl. No.: 09/238,068

(22) Filed: Jan. 27, 1999

(30) Foreign Application Priority Data

Feb. 2, 1998 (JP) .......................................... 10-033566

(51) Int. Cl.⁷ .............................................. H04B 1/713
(52) U.S. Cl. ........................ 375/153; 375/147; 375/152
(58) Field of Search ................................ 375/148, 147, 375/153, 152

(56) References Cited

U.S. PATENT DOCUMENTS

| | | | |
|---|---|---|---|
| 4,653,069 A | * 3/1987 | Roeder | ........................ 380/31 |
| 5,867,526 A | 2/1999 | Nagazumi | |
| 5,887,025 A | 3/1999 | Nagazumi | |
| 5,974,038 A | * 10/1999 | Shou et al. | .................. 370/335 |

* cited by examiner

Primary Examiner—Stephen Chin
Assistant Examiner—David B. Lugo
(74) Attorney, Agent, or Firm—Birch, Stewart, Kolasch & Birch, LLP

(57) ABSTRACT

A RAKE combiner apparatus uses a charge transfer element, which can permit a high-precision RAKE receiver to be constructed by a simple circuit structure, has lower consumption power, can allow the finger number to be arbitrarily set within a range of up to the number of taps of the matched filter and can implement a highly efficient RAKE process. This RAKE combiner apparatus has at least one charge routing mechanism for receiving a group of charge signals in at least one time sequence, and transferring each of the input charge signals to at least two different kinds of routes in accordance with a separately supplied digital signal; at least one signal accumulation mechanism for executing signal accumulation by integrating the routed charge signals directly as charges or after subjecting the routed charge signals to predetermined signal conversion; and a RAKE controller for predicting a multi-path environment of communication paths associated with reception of the input charge signals, and supplying a digital signal for determining a transfer route of each of the input charge signals to the charge routing mechanism.

14 Claims, 9 Drawing Sheets

S/H : SAMPLE AND HOLD
MUL : MULTIPLIER

RAKE COMBINER APPARATUS USING CHARGE TRANSFER ELEMENT

BACKGROUND OF THE INVENTION

1. Field of the Invention

The present invention relates to a RAKE combiner apparatus using a charge transfer element, which is used in a path diversity receiver in a CDMA (Code Division Multiple Access) communication.

2. Description of the Related Art

The path diversity reception technology becomes important technical means which is inevitable today in mobile communication apparatuses that are used in multifarious communication environments.

The RAKE system, one of such technical means, is currently at the practical phase due to the recent improvement on the performance of digital signal processing. In the mobile communication field which has some restrictions on the equipment size and power supply, however, attempts to put the system to a practical use are still being made.

That is, there are the following problems to which optimal solutions have not been found yet. First, in digitizing all the processes in the base band as shown in FIGS. 7 and 8, while a more ideal system can be constructed, A/D conversion and matched filtering requires great power. Secondly, in a case where a matched filter is constituted of an analog circuit as shown in FIGS. 9 and 10, while power consumption approaches a practical level, new restrictions on the length of matching codes or the like may come up due to the precision of the analog circuit.

In either case, as the "number of fingers" that greatly affects improvement on the performance of the RAKE process leads to system complication, as many as about four fingers are merely used.

One solution to the above problem is a "matched filter acting in charge domain" which is disclosed in Japanese Patent No. 2773075 (corresponding to U.S. patent application Ser. Nos. 08/997,848) and 09/064,751, filed by the same applicant as that of the present invention. As shown in FIG. 11, this device receives an input potential signal and sequentially outputs a train of charge packets which indicate a correlation with a predetermined matching code.

SUMMARY OF THE INVENTION

Accordingly, it is an object of the present invention to provide a RAKE combiner apparatus using a charge transfer element, which can permit a high-precision RAKE receiver to be constructed by a simple circuit structure that merely performs selective accumulation of the output charges, has very few active elements, resulting in lower consumption power, can allow the finger number to be arbitrarily set within a range of up to the number of taps of the matched filter and can implement a highly efficient RAKE process.

To achieve this object, according to this invention, a RAKE combiner apparatus using a charge transfer element, comprises at least one charge routing mechanism for receiving a group of charge signals in at least one time sequence, and transferring each of the input charge signals to at least two different kinds of routes in accordance with a separately supplied digital signal; at least one signal accumulation mechanism for executing signal accumulation by integrating the routed charge signals directly as charges or after subjecting the routed charge signals to predetermined signal conversion; and a RAKE controller for predicting a multipath environment of communication paths associated with reception of the input charge signals, and supplying a digital signal for determining a transfer route of each of the input charge signals to the charge routing mechanism.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

The constitution and operation of one embodiment of the present invention will now be described referring to FIGS. 1 and 6.

Figure 1:
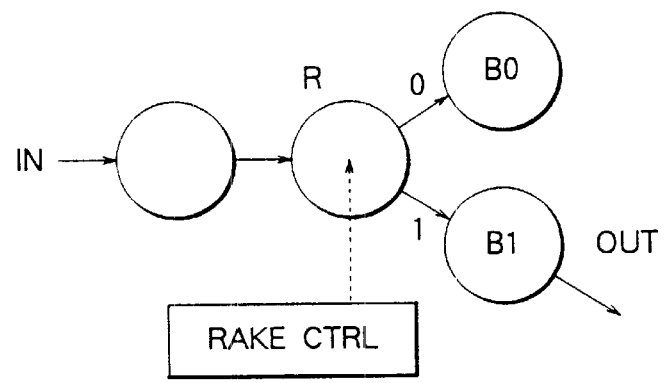
FIG. 1 is a system diagram illustrating the basic constitution of this invention.

FIG. 1 is a system diagram illustrating the basic constitution of this invention.

In this constitution, an input IN is a sequence of charge packets output from a matched filter, a router R transfers each charge packet in a direction of 0 or 1 in accordance with the value of a digital signal which is supplied from a RAKE controller (RAKE CTRL), and the amount of stored charges is evaluated after the charge packets are accumulated for a predetermined period (normally one symbol time) in buffers B0 and B1.

In FIG. 1, the broken-lined arrow shows a signal indicating the transfer direction for charge packet, ○ indicates where charges are stored, and the solid-lined arrows indicate transfer paths for charge packets. Since there are various ways of charge transfer even in a case where a CCD is used, such as the three-phase type and four-phase type, those transfer systems are generalized and expressed by using simple arrows in FIG. 1.

In the simplest constitution, only one buffer B1 accumulates charges, and the other buffer B0 serves as a gate for discharging charges, so that the output of the matched filter is selectively stored only in the buffer B1. But, designing the other buffer B0 to have the same structure as the buffer B1 can provide a constitution which generates a differential type output.

In a case where the input IN has a form of differential signals alternately multiplexed in a time-divisional fashion, the constitution in FIG. 1 can also be used as it is, and one of two packets which forms a differential pair is transferred to the buffer B0 and the other to the buffer B1, in accordance with a digital signal supplied from the RAKE controller. This also can allow a RAKE process to be implemented with respect to a differential input.

Figure 2:
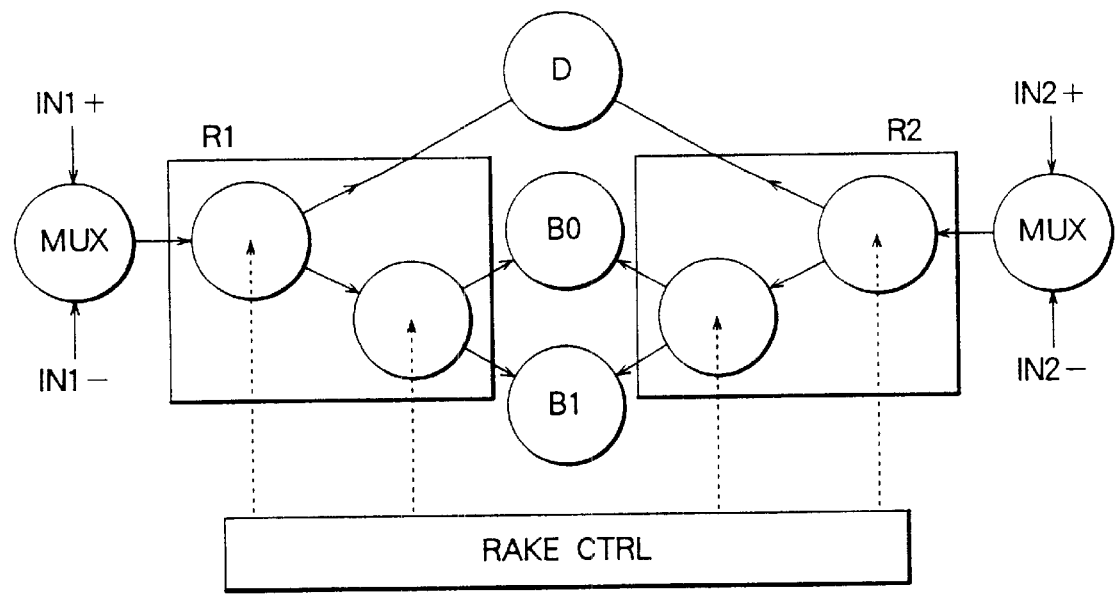
FIG. 2 is a system diagram exemplifying a RAKE combiner according to this invention, which operates with two sets of differential charge signals and accumulates its outputs in two buffers.

FIG. 2 shows one example of a RAKE combiner, which operates with two sets of differential charge signals IN1 and IN2 and accumulates its outputs in two buffers B0 and B1.

In the example shown in FIG. 2, each of routers R1 and R2 is constituted of two bidirectional routers which are connected in series to each other and respectively route the charges to a charge discharge gate D and buffers B0 and B1. As shown in FIG. 2, the buffers B0 and B1 are common to the differential charge signals IN1 and IN2, so that the results of RAKE processes of two systems are added.

Figure 3:
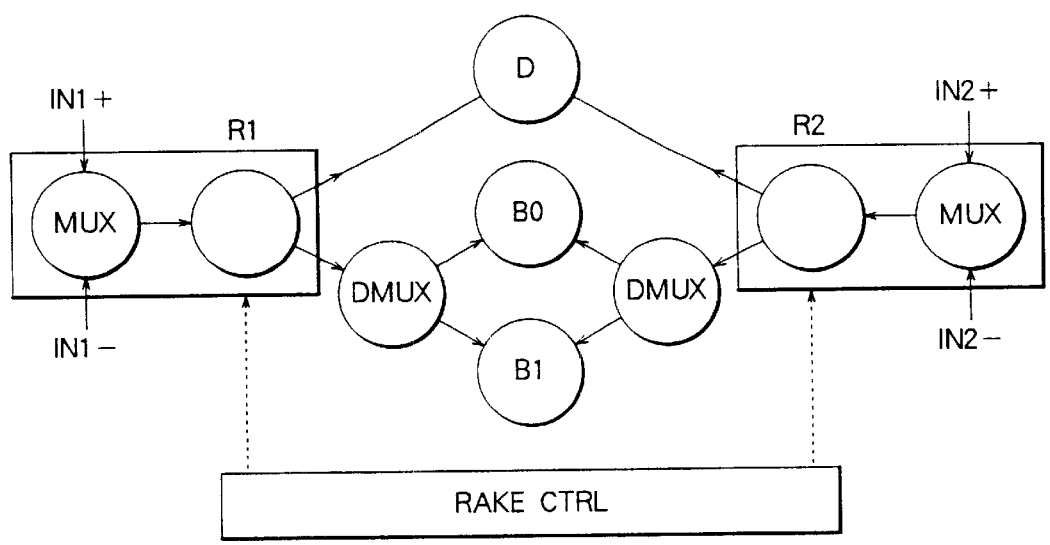
FIG. 3 is a system diagram showing another example of the RAKE combiner according to this invention, which operates with two sets of differential charge signals and accumulates its outputs in two buffers.

Although the differential signal is time-divisionally multiplexed by a multiplexer MUX before it is supplied to the associated router in the illustrated constitution, the same function can of course be implemented even in a case where the arrangement order of a pair of differential signals is controlled in the process of time-divisional multiplexing. FIG. 3 exemplifies this constitution.

Figure 4:
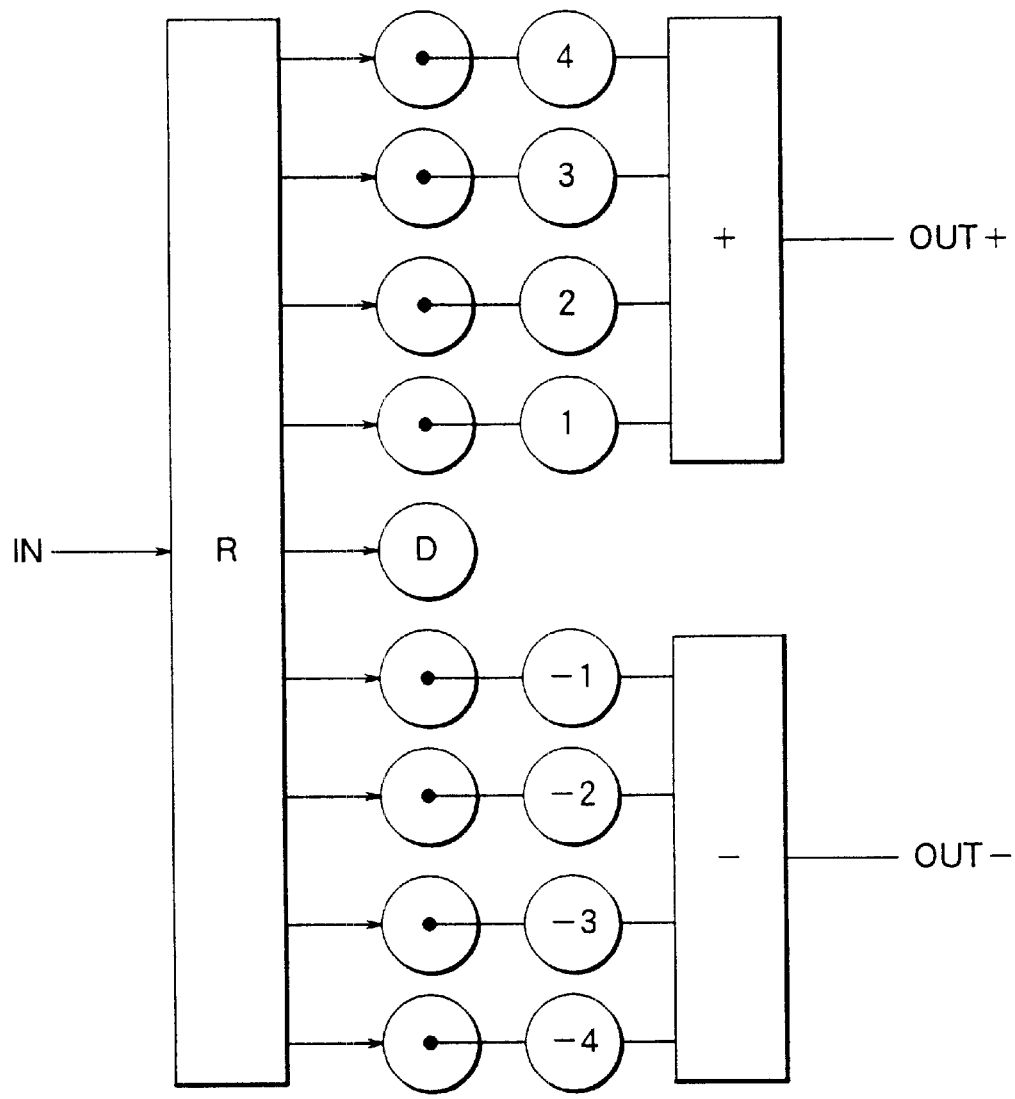
FIG. 4 is a system diagram depicting one example of a combiner according to this invention, which has a four-stage weighting function for each of positive and negative signs.

FIG. 4 depicts one example of a combiner which has a four-stage weighting function for each of positive and negative signs.

In this example, an input charge packet is routed to nine routes including the charge discharge gate D by the action of a router R, each buffer is provided with a function of detecting the amount of stored charges as a signal of, for example, the potential, and the detection results of each buffer are multiplied by different weighting coefficients and then added together by a+adder or a−adder, as illustrated, thus generating a differential output signal.

By selecting one of the nine routes, this circuit can weight each input charge packet in accordance with the reliability of the corresponding path, so that the circuit can demonstrate its effectiveness in improving the communication reliability by means of, for example, removing an unexpected noise component.

Although the example in FIG. 4 shows weighted addition in a voltage mode, it is of course possible to carry out every such addition in a charge domain through division and addition of charges.

Figure 5:
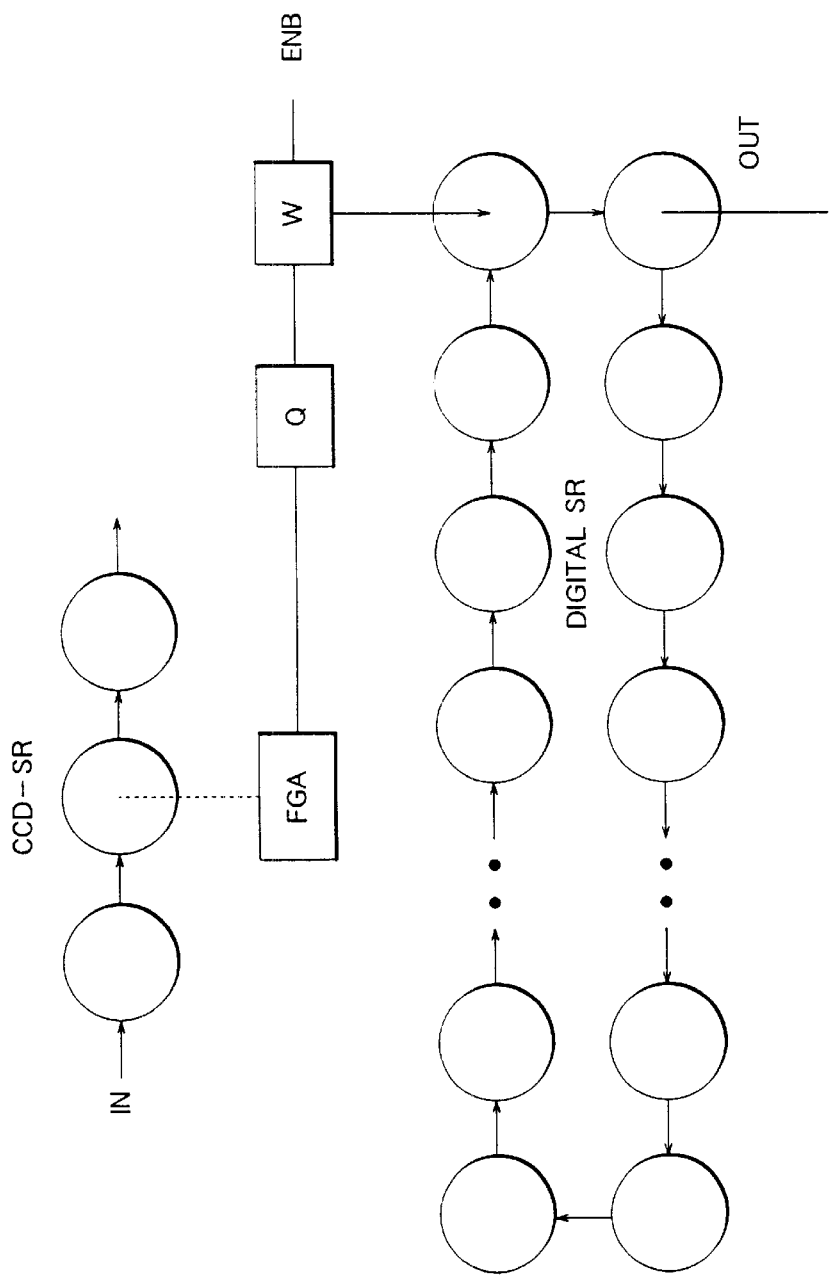
FIG. 5 is a system diagram illustrating the constitution of a simple RAKE controller of this invention.

FIG. 5 shows the constitution of a very simple RAKE controller.

In this example, a charge signal from the matched filter is individually measured by charge detection means FGA (Floating Gate) while it is being transferred via an analog shift register (CCD-SR), and the measuring result is converted to a digital signal by a quantizer Q like a comparator or A/D converter.

This digital signal is recorded via a writing unit W in a circular digital shift register (DIGITAL SR) which performs transfer in synchronism with the analog shift register (CCD-SR).

As a result, the signal stored in the digital shift register (DIGITAL SR) becomes RAKE profile data that is expressed in a digital form, and a digital signal bit OUT which is output from a read port at the adequate position represents the arrangement of a path to be added.

The digital shift register (DIGITAL SR) in FIG. 5 is of course illustrated in such a way as to make the explanation of the operation simpler, and can easily be replaced with ordinary memory means.

Although the constitution exemplified in FIG. 5 is not designed to evaluate the reliability of each path based on comparison of the current profile data with old one, this comparison of the current profile data with old one can easily be implemented by using a scheme of switching memory banks from one to another.

Measuring the charge signal that passes the analog shift register (CCD-SR) can be accomplished by the scheme using the charge detection means FGA shown in FIG. 5 as well as a scheme of dividing each charge signal by means of a dynamic splitter and converting a part of the charge signal to a potential signal by means of diffusion. Using the adequate one of those schemes is the matter of design choice.

Figure 6:
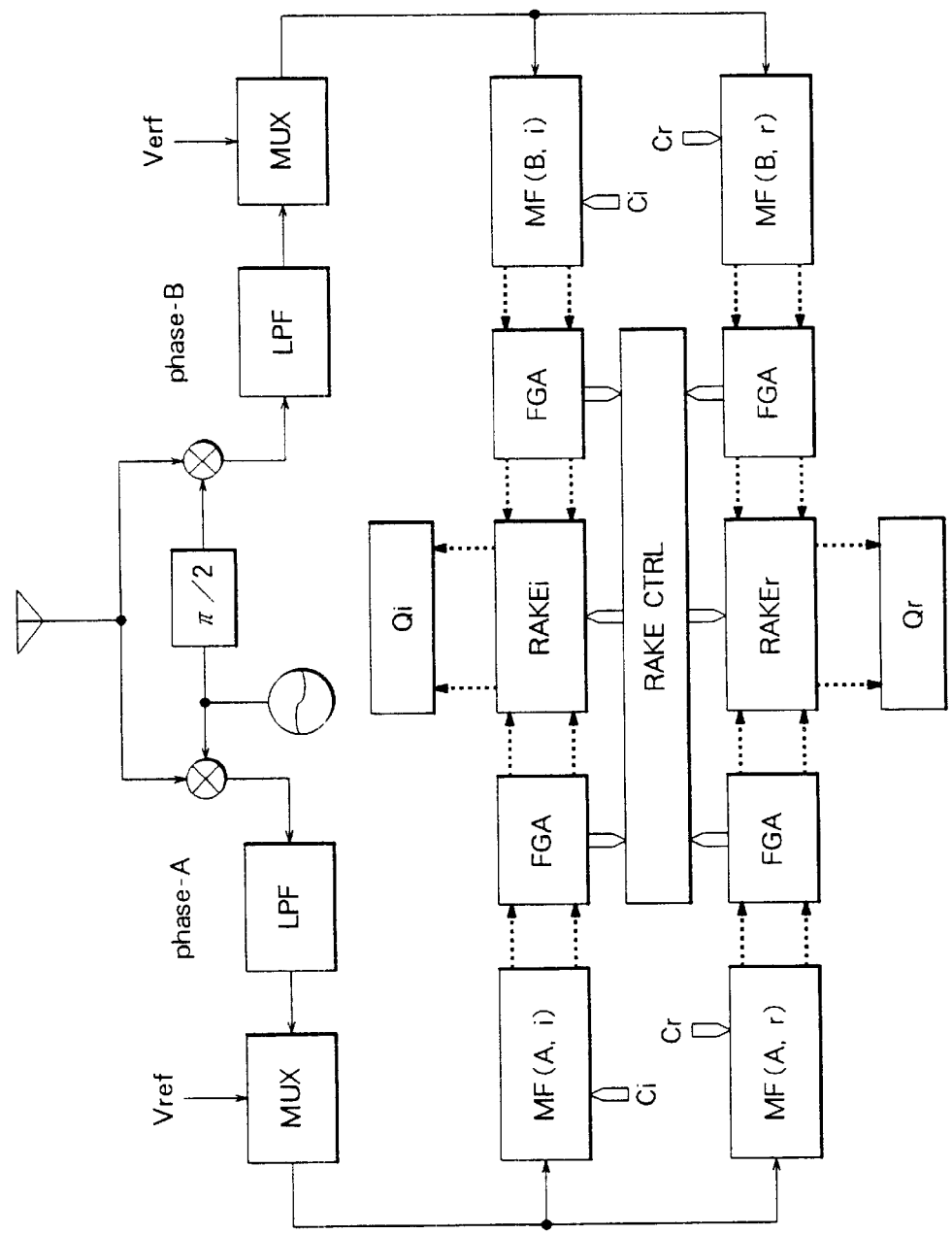
FIG. 6 is a system diagram showing the constitution of a receiver equipped with a RAKE combiner of this invention.
Figure 7:
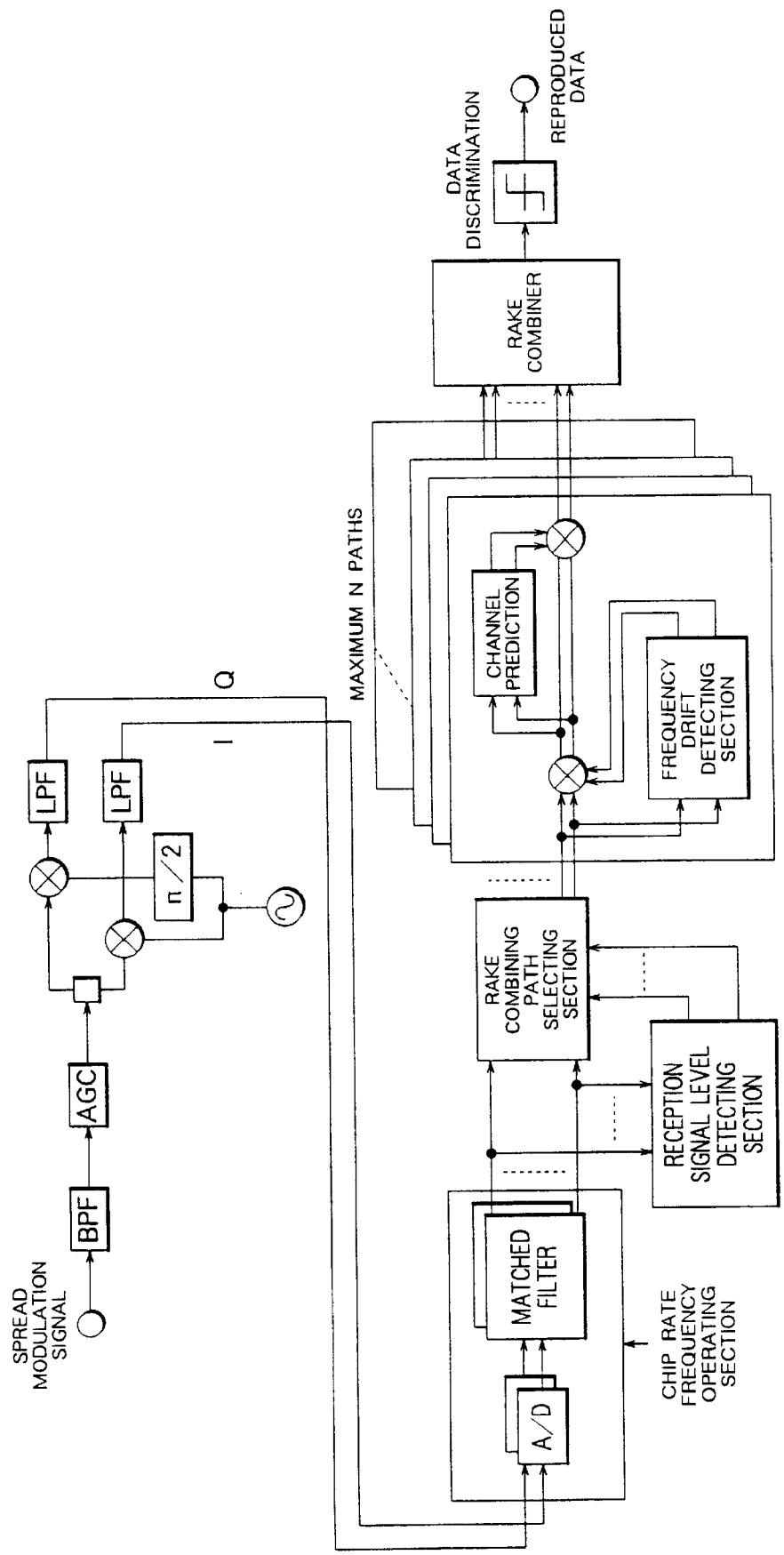
FIG. 7 is a block diagram showing one constitution of a conventional DS-CDMA coherent receiver.
Figure 8:
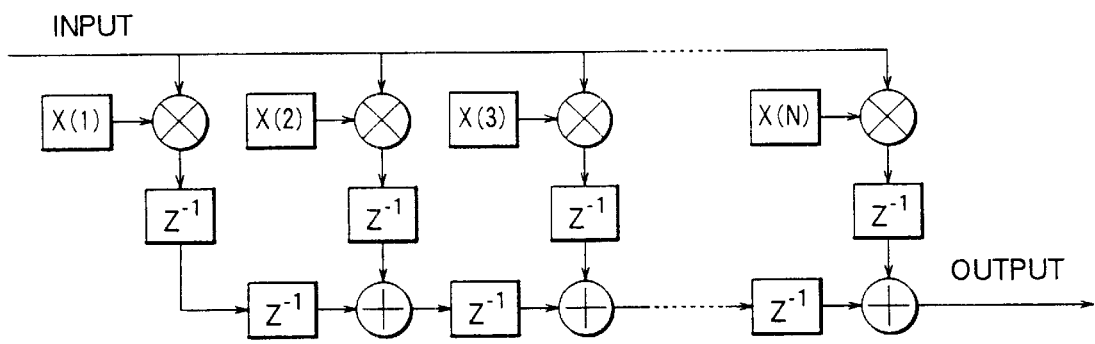
FIG. 8 is a circuit structural diagram depicting one constitution of a conventional digital matched filter.
Figure 9:
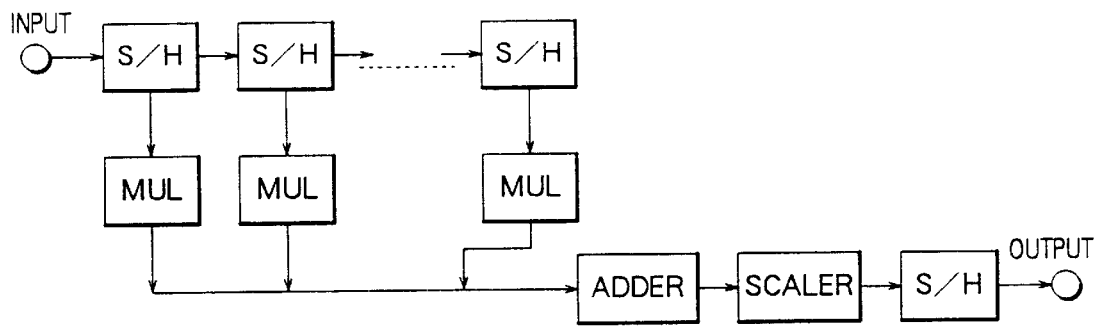
FIG. 9 is a block diagram illustrating one example of the operational principle of a conventional ADF.
Figure 10:
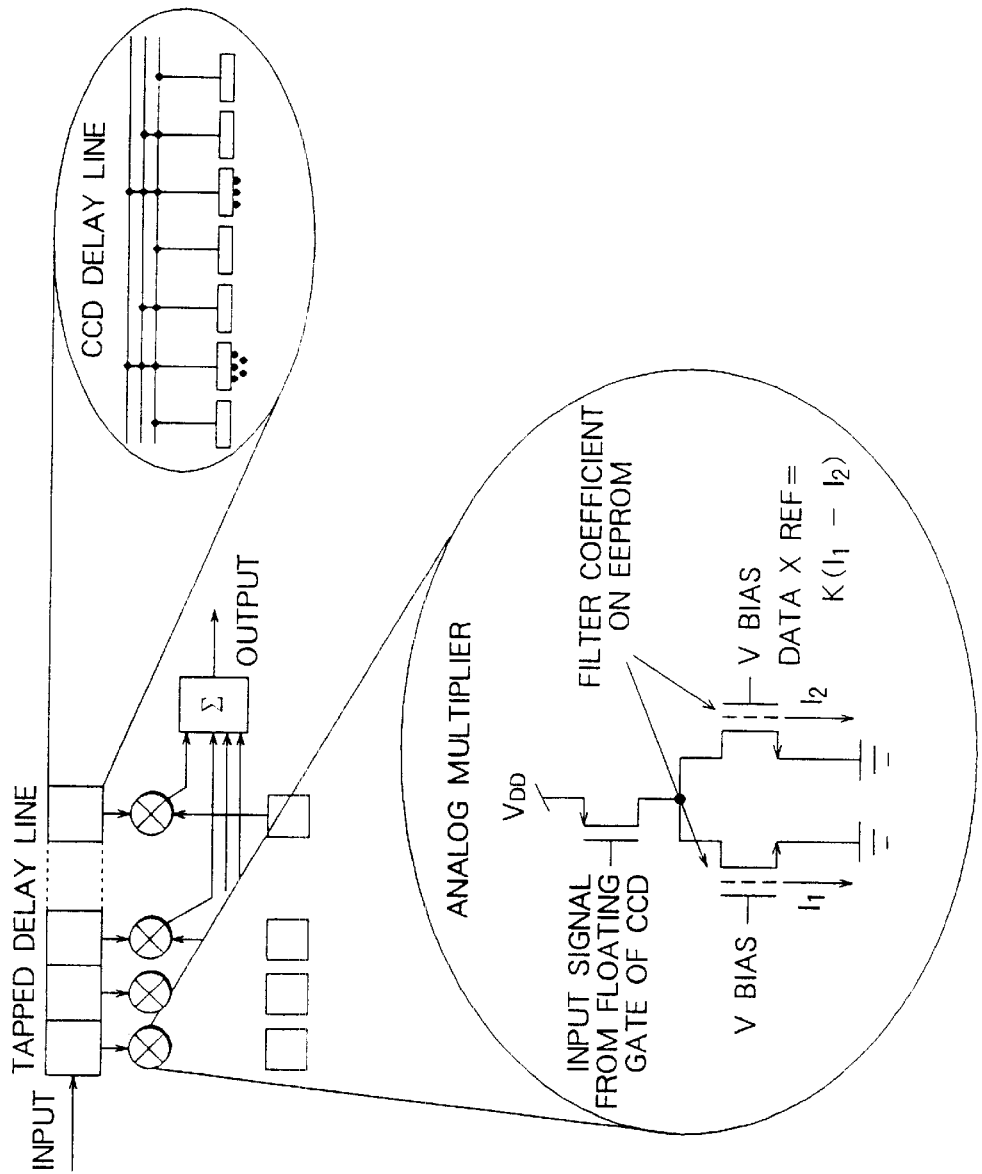
FIG. 10 is a block diagram exemplifying the constitution of a conventional parallel matched filter.
Figure 11:
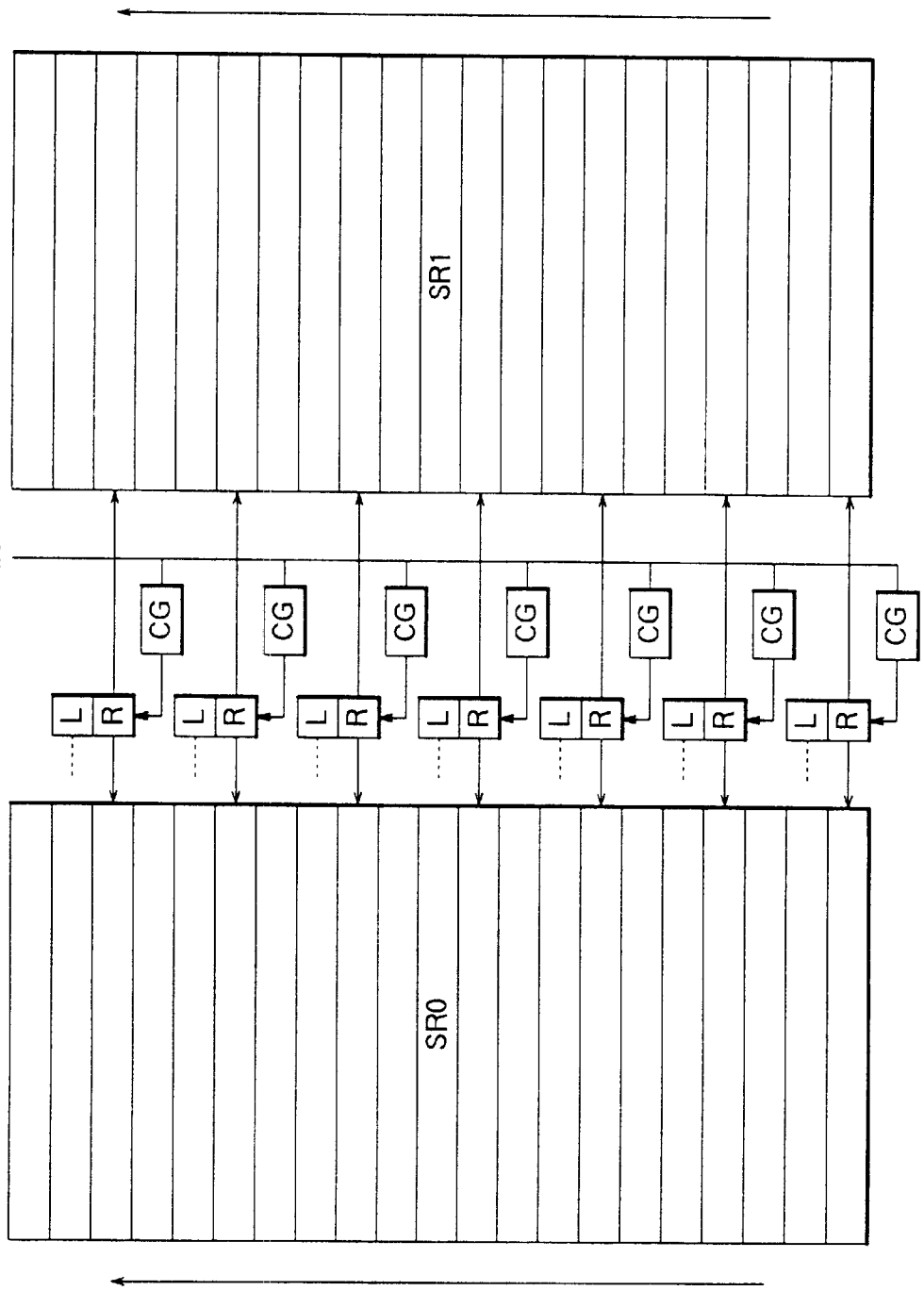
FIG. 11 is a structural diagram depicting one example of a conventional matched filter which operates in a charge domain.

FIG. 6 exemplifies the constitution of a receiver equipped with a RAKE combiner of this invention.

A spread spectrum radio wave of QPSK (Quadri-Phase Shift Keying) modulation which is caught by an antenna is separated by means of two modulators to two components of the phase A and phase B, which are in turn respectively supplied as baseband signals to two matched filters MF via associated low-pass filters LPF.

Each matched filter MF performs despreading using a spread code Ci or Cr; in this example, a pair of charge packets which form a differential signal are sequentially output and are subjected to complex RAKE synthesis in a RAKE combiner (RAKEi, RAKEr).

At this time, the output of the matched filter MF has such a structure as is observable by the charge detection means FGA as needed, and the observation result is referred to in determining which RAKE finger to select or implementing weighting in the RAKE combiner (RAKEi, RAKEr).

Since the proper RAKE finger is selected by adding charge packets that are generated by the matched filters MF, this system, unlike the conventional RAKE system, has no structural restriction, so that all the packets can be used depending on the conditions.

The output signals of the RAKE combiners (RAKEi, RAKEr) are respectively evaluated by quantizers Qi and Qr after temporary storage for one symbol time, so that symbols of two systems are determined.

As apparent from FIGS. 1 to 6, because this system can design most of the signal processing from the matched filter MF to RAKE on a CCD, the system can cope with CDMA using long spread codes have over several hundred bits. Because of the very simple structure, this system is significantly effective from the viewpoint of reducing power consumption and the manufacturing cost.

The entire disclosure of Japanese Patent Application No. 10-33566 filed on Feb. 2, 1998 including the specification, claims, drawings and summary is incorporated herein by reference in its entirety.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A RAKE combiner apparatus using a charge transfer element, comprising:
   at least one charge routing mechanism for receiving a group of input charge signals in at least one time sequence, and transferring each of said input charge signals to at least two different kinds of routes in accordance with a separately supplied digital signal;
   at least one signal accumulation mechanism for executing signal accumulation by integrating routed charge signals directly as charges or after subjecting said routed charge signals to predetermined signal conversion; and
   a RAKE controller for predicting a multi-path environment of communication paths associated with reception of said input charge signals, and supplying a digital signal for determining a transfer route of each of said input charge signals to said charge routing mechanism.

2. The RAKE combiner apparatus according to claim 1, wherein said charge routing mechanism transfer charges to three kinds of routes, two of which are connected to two different signal accumulation mechanisms.

3. The RAKE combiner apparatus according to claim 1, wherein each of said input charge signals is a differential type signal constituted of a pair of charge packets.

4. The RAKE combiner apparatus according to claim 2, wherein each of said input charge signals is a differential type signal constituted of a pair of charge packets.

5. The RAKE combiner apparatus according to claim 1, wherein there are a plurality of signal accumulation mechanisms, and after integration, signals held in said signal accumulation mechanisms are weighted with respective predetermined weighting coefficients before addition.

6. The RAKE combiner apparatus according to claim 3, wherein there are a plurality of signal accumulation mechanisms, and after integration, signals held in said signal accumulation mechanisms are weighted with respective predetermined weighting coefficients before addition.

7. The RAKE combiner apparatus according to claim 4, wherein there are a plurality of signal accumulation mechanisms, and after integration, signals held in said signal accumulation mechanisms are weighted with respective predetermined weighting coefficients before addition.

8. The RAKE combiner apparatus according to claim 1, further comprising:
   input signal measuring means for measuring said group of charge signals to be input; and
   at least one quantizer for quantizing a measuring result by comparing said measuring result with a reference signal, whereby a quantized output is supplied to said RAKE controller which performs processes of determining selection of each of said input charge signals, identifying a polarity thereof, evaluating reliability of a signal path and determining weighting coefficients to thereby designate said transfer route.

9. The RAKE combiner apparatus according to claim 2, further comprising:
   input signal measuring means for measuring said group of charge signals to be input; and
   at least one quantizer for quantizing a measuring result by comparing said measuring result with a reference signal, whereby a quantized output is supplied to said RAKE controller which performs processes of determining selection of each of said input charge signals, identifying a polarity thereof, evaluating reliability of a signal path and determining weighting coefficients to thereby designate said transfer route.

10. The RAKE combiner apparatus according to claim 3, further comprising:
    input signal measuring means for measuring said group of charge signals to be input; and
    at least one quantizer for quantizing a measuring result by comparing said measuring result with a reference signal, whereby a quantized output is supplied to said RAKE controller which performs processes of determining selection of each of said input charge signals, identifying a polarity thereof, evaluating reliability of a signal path and determining weighting coefficients to thereby designate said transfer route.

11. The RAKE combiner apparatus according to claim 4, further comprising:
    input signal measuring means for measuring said group of charge signals to be input; and
    at least one quantizer for quantizing a measuring result by comparing said measuring result with a reference signal, whereby a quantized output is supplied to said RAKE controller which performs processes of determining selection of each of said input charge signals, identifying a polarity thereof, evaluating reliability of a signal path and determining weighting coefficients to thereby designate said transfer route.

12. The RAKE combiner apparatus according to claim 5, further comprising:
    input signal measuring means for measuring said group of charge signals to be input; and
    at least one quantizer for quantizing a measuring result by comparing said measuring result with a reference signal, whereby a quantized output is supplied to said RAKE controller which performs processes of determining selection of each of said input charge signals, identifying a polarity thereof, evaluating reliability of a signal path and determining weighting coefficients to thereby designate said transfer route.

13. The RAKE combiner apparatus according to claim 6, further comprising:
    input signal measuring means for measuring said group of charge signals to be input; and
    at least one quantizer for quantizing a measuring result by comparing said measuring result with a reference signal, whereby a quantized output is supplied to said RAKE controller which performs processes of determining selection of each of said input charge signals, identifying a polarity thereof, evaluating reliability of a signal path and determining weighting coefficients to thereby designate said transfer route.

14. The RAKE combiner apparatus according to claim 7, further comprising:
    input signal measuring means for measuring said group of charge signals to be input; and
    at least one quantizer for quantizing a measuring result by comparing said measuring result with a reference signal, whereby a quantized output is supplied to said RAKE controller which performs processes of determining selection of each of said input charge signals, identifying a polarity thereof, evaluating reliability of a signal path and determining weighting coefficients to thereby designate said transfer route.

* * * * *